J. ECKHARD.
TRANSMISSION GEARING.
APPLICATION FILED OCT. 21, 1910.
1,034,349.
Patented July 30, 1912.
3 SHEETS—SHEET 1.
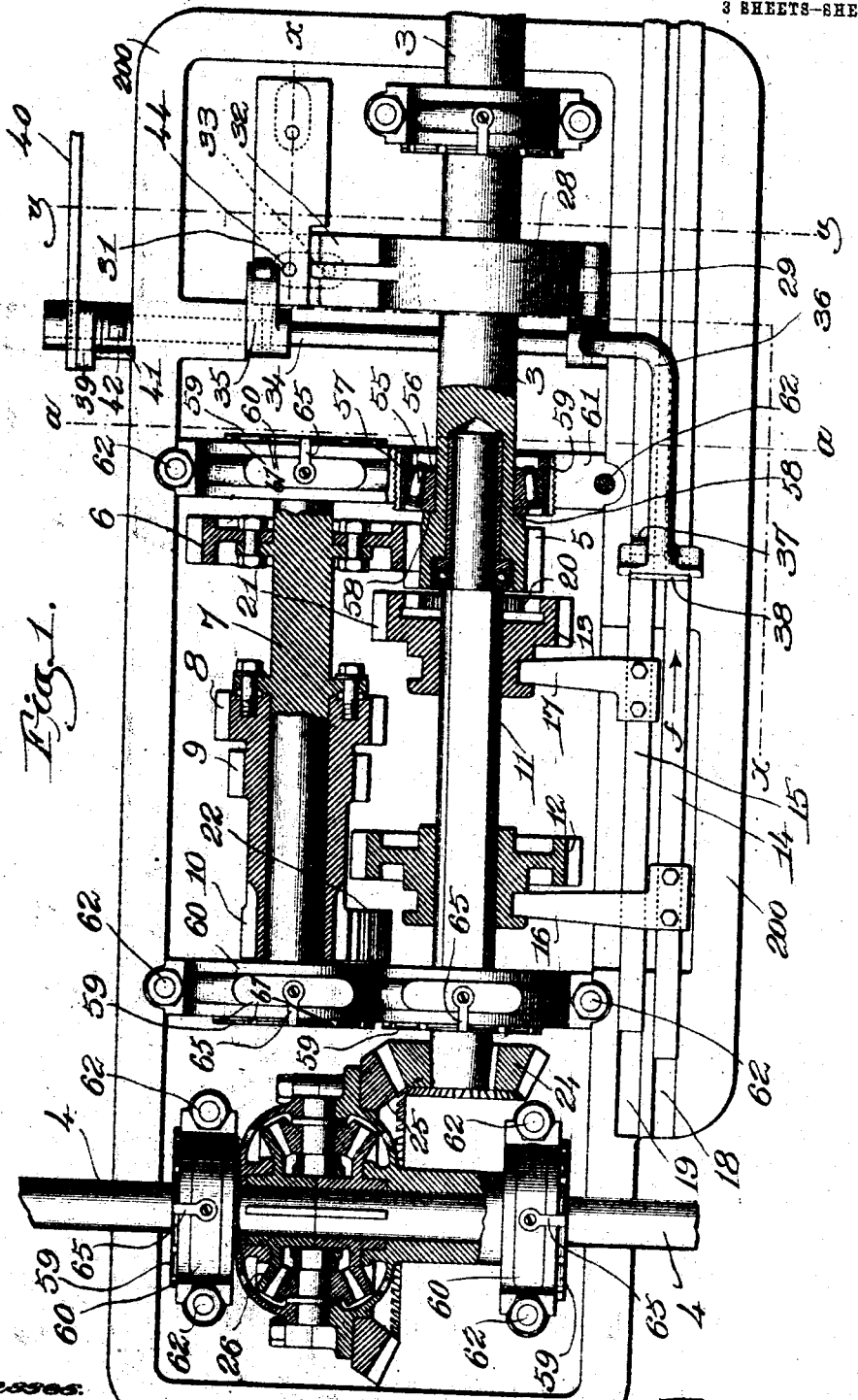

J. ECKHARD.
TRANSMISSION GEARING.
APPLICATION FILED OCT. 21, 1910.
1,034,349.
Patented July 30, 1912.
3 SHEETS—SHEET 2.
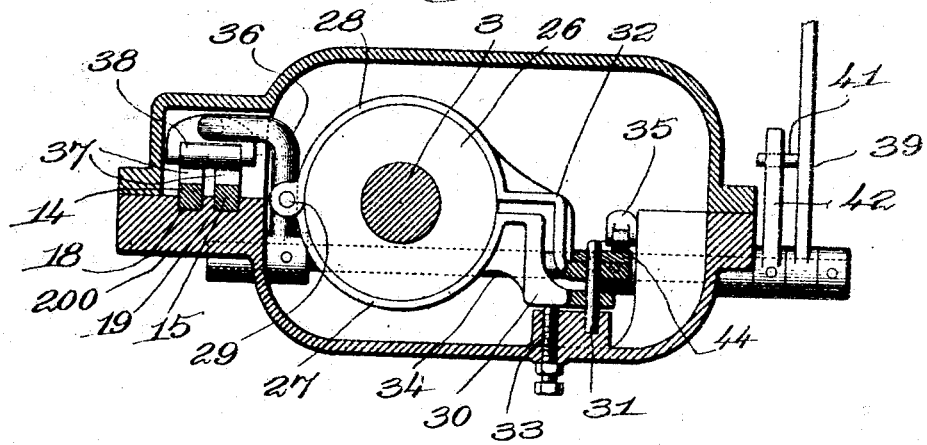
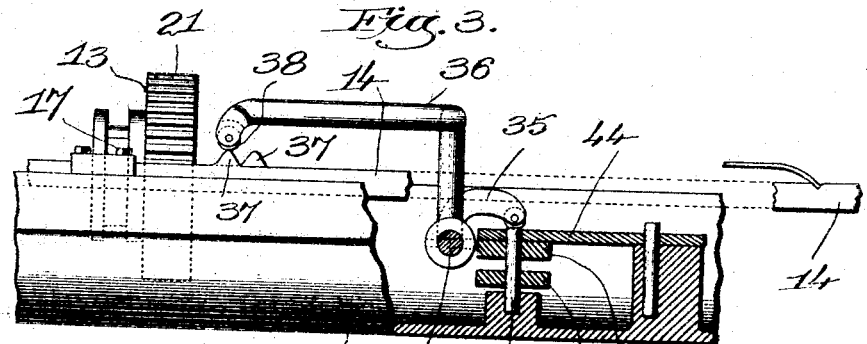
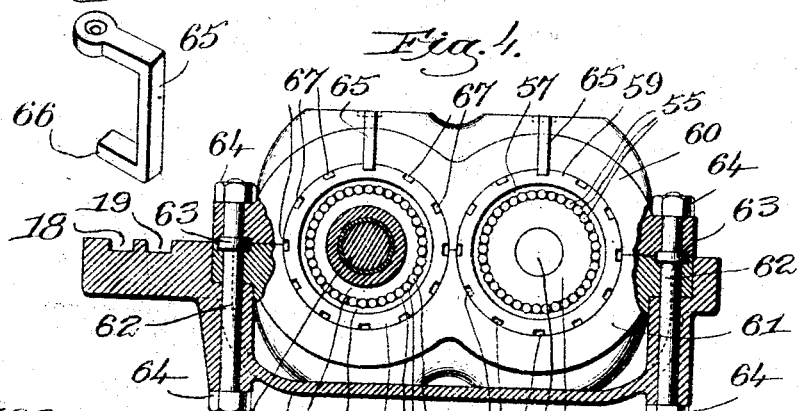
Witnesses.
Thomas J. Drummond.
Joseph M. Ward.
Inventor.
John Eckhard.
by Busby Gregory
Attys.

J. ECKHARD.
TRANSMISSION GEARING.
APPLICATION FILED OCT. 21, 1910.
1,034,349.
Patented July 30, 1912.
3 SHEETS—SHEET 3.
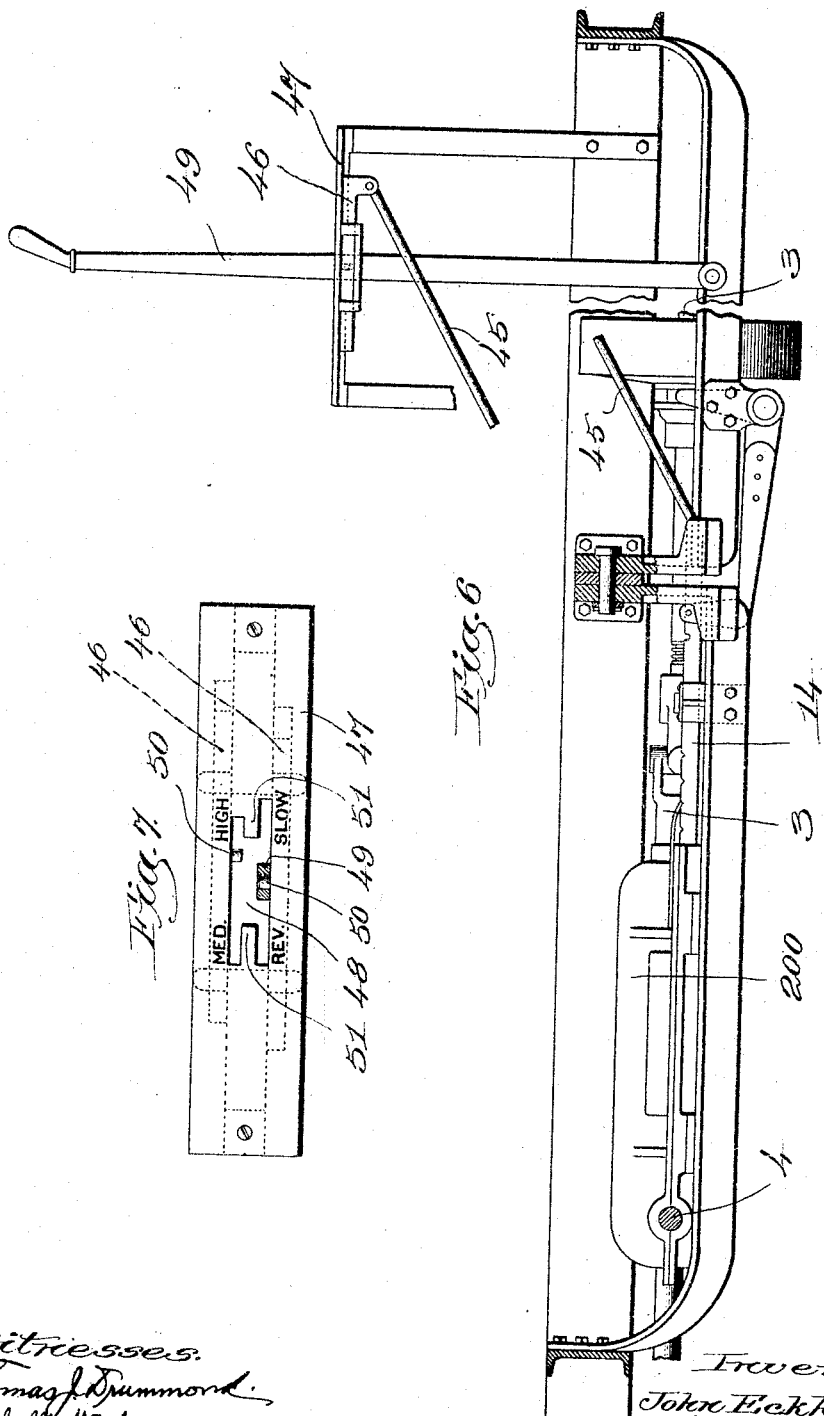

UNITED STATES PATENT OFFICE.

JOHN ECKHARD, OF BOSTON, MASSACHUSETTS, ASSIGNOR TO HERCULES MOTOR TRUCK COMPANY, OF BOSTON, MASSACHUSETTS, A CORPORATION OF MASSACHUSETTS.

TRANSMISSION-GEARING.

1,034,349.      Specification of Letters Patent.      Patented July 30, 1912.

Application filed October 21, 1910. Serial No. 588,237.

*To all whom it may concern:*

Be it known that I, JOHN ECKHARD, a citizen of the United States, and resident of Boston, county of Suffolk, State of Massachusetts, have invented an Improvement in Transmission-Gearing, of which the following description, in connection with the accompanying drawing, is a specification, like characters on the drawing representing like parts.

This invention relates to transmission gearing adapted for use in automobiles, and the object of the invention is to provide a novel construction by which more or less of a braking effect may be applied to the gears of the transmission gearing whenever the shiftable gears are shifted to effect a change of speed, thereby to reduce more or less the speed of rotation of the gears, so that when the shiftable gear is thrown into mesh with another gear the two gears will be rotating at substantially the same speed and the danger of stripping the teeth of the gears may be avoided.

In changing the speed of an automobile it is customary first to disconnect the clutch by which the driving shaft is operated, and then to shift the shiftable gears of the transmission mechanism thereby to effect the desired change in speed while the clutch is thus disconnected. Where the gears of the transmission gearing are large and heavy, as in the case of transmission gearing adapted for a motor truck, the momentum of the gears is such that they will continue to rotate with practically undiminished speed for a considerable length of time after the clutch has been disconnected, and after the shiftable gears of the transmission gearing are free. When any two gears of this nature are thrown into engagement with each other while they are moving at different speeds relative to each other, there is always danger that some of the teeth of one or both gears will be stripped and it is desirable that the two gears should be brought to substantially the same speed before bringing them into engagement. By my invention I have provided a brake mechanism which is so arranged that it can be operated to reduce more or less the speed of rotation of the gears of the transmission gearing during the shifting of the shiftable gear to effect a change in speed and by means of this construction I am able to so regulate the relative speed of the gears that are to be brought into mesh that all danger of stripping the teeth of the gears can be avoided.

I will first describe one embodiment of my invention and then point out the novel features thereof in the appended claims.

In the drawings, Figure 1 is a plan view of my improved transmission gearing with some of the parts shown in section. Fig. 2 is a section on the line $y$—$y$ Fig. 1; Fig. 3 is a section on substantially the line $x$—$x$ Fig. 1; Fig. 4 is a section on the line $a$—$a$ Fig. 1; Fig. 5 is a view of the locking member for the adjustable bushing of the bearing; Fig. 6 is a view of the transmission gearing supported in its frame, and showing the lever for operating the shiftable gears of the transmission gearing; Fig. 7 is a view of the grid.

In the drawings 3 designates the driving shaft which is connected to and is driven by the engine in any suitable way, and 4 represents the driven shaft. The driving and driven shafts are shown as being connected by a transmission gearing of that type adapted to be adjusted for giving a variety of speeds of rotation to the driven shaft. The transmission gearing herein shown, and which in most respects is of a type that is familiar to the art, comprises a gear 5 fast or integral with the shaft 3, and meshing with a larger gear 6 fast on a shaft 7. The shaft 7 has thereon three gears, 8, 9 and 10.

11 is a shaft carrying the shiftable gears 12 and 13, said shaft 11 being herein shown as situated in line axially with the shaft 3. The shiftable gears 12 and 13 are splined to the shaft 11, and are adapted to be shifted longitudinally thereof by two actuators 14 and 15, which are provided with forked arms 16 and 17 that engage the hubs of the gears 12 and 13 in a well known way. Actuators 14 and 15 are slidably mounted in grooves or guideways 18 and 19, formed in the casing 200, in which the transmission gearing is inclosed, said actuators being operated by the usual lever as will be more fully described. The shiftable gear 13 has interior teeth 20 that are adapted to engage the teeth of the gear 5, and is provided with exterior gear teeth 21 that are adapted to engage the teeth of the gear 8. The shiftable gear 12 is adapted to be brought into mesh either with the gear 9 or with the idler or intermediate gear 22, which meshes constantly with the gear 10. The shaft 11 is geared to the driven shaft 4 in some suitable way, as by means of the beveled gears 24, 25, and a suitable differential gear mechanism 26 if desired. When the shiftable gear 13 is in engagement with the gear 5, the driven shaft will be operated directly from the engine shaft 3 and the counter-shaft 7 will simply run idly. This is the arrangement when high speed is desired. When the shiftable gear 13 is in mesh with the gear 8, the shaft 11 and the driven shaft will be rotated at a slower speed through the gears 5, 6, 8 and 13. When the shiftable gear 13 is disconnected from both the gears 5 and 8, and the shiftable gear 12 is in mesh with the gear 9, the driven shaft will be rotated at still slower speed, while when the shiftable gear 12 is thrown into mesh with the idler 22, the driven shaft will be rotated in reverse direction.

The parts as thus far described are or may be of any suitable construction and form no part of my present invention.

When the transmission gearing is a heavy one, adapted to transmit a high horse power, the gears of the transmission gearing have so much weight that when, during the operation of changing the speed, the main driving shaft 3 is unclutched from the engine, and the shiftable gear is thrown out of mesh with one of the gears preparatory to throwing it into mesh with another gear, the momentum of the gears is sufficient to cause them to continue rotating with practically undiminished speed for a considerable length of time. In order to prevent the danger of stripping the teeth of the gears, it is desirable that the gears that are to be thrown into mesh should be brought as near as possible to the same speed of rotation before they are thrown into engagement with each other. My present invention accomplishes this object and in the selected embodiment of my invention, I do this by providing a brake for the driving shaft 3 and also providing means whereby said brake can be applied to a greater or less extent during the shifting of the shiftable gears and before either of said gears is carried into mesh with another gear thereby to reduce the speed of the gears connected with the driving shaft so that the two gears which are to be brought into mesh will have substantially the same speed of rotation before they are finally brought into engagement with each other. I prefer to apply the brake to the shaft 3 automatically, and in the embodiment of invention illustrated have shown a means for accomplishing this end which is operated by either one of the actuators 14 and 15, so that the brake will be applied whenever either actuator is moved. In this way the gears of the transmission gearing can be slowed down more or less before either of the shiftable gears is thrown into mesh with any gear of the transmission gearing.

While it is within my invention to employ any suitable brake for retarding or stopping the rotation of the driving shaft, I have herein shown said shaft having rigid or integral therewith a brake drum or disk 26, which is acted upon by a brake band. The brake band is shown as comprising the two parts 27 and 28 that are hinged together at 29, the part 27 having the arm 30 extending therefrom, which is held in place by a positioning pin 31 carried by the casing 200. The part 28 also has an arm 32 extending therefrom, which is provided with an aperture through which the positioning pin 31 extends. The arm 30 rests on a stop screw 33 carried by the casing, so that by applying pressure to the end of the arm 32 the brake will be applied to the brake disk 26. As stated above, I have provided mechanism for automatically applying this brake during the shifting movement of either of the actuators 14 or 15, and the mechanism I have herein illustrated for accomplishing this comprises a shaft 34 journaled in the casing 200, and provided at one end with an arm 35 adapted to bear on the arm 32 and provided at its other end with an arm 36, which has a portion overlying the actuators 14 and 15. Each actuator is provided with a projection 37, which is adapted to engage the end of the arm 36 as the actuator is moved longitudinally, thereby rocking the shaft 34 and applying pressure to the arm 32 of the brake member 28. The cam projections 37 are so arranged that this braking pressure will be applied momentarily during the shifting movement of each actuator, but will be relieved before each actuator completes its movement. In order to permit the operation of applying and then relieving the braking pressure while each actuator is making its operative movement, I have separated the gears 9, 10 and 5, 8 so that each actuator has to make a stroke of considerable length in order to carry its shiftable gear from one extreme position to the other. By doing so, there is plenty of time between the time when each shiftable gear becomes disengaged from one gear and before it is thrown into engagement with the other gear to permit the end of the arm 36 to pass over the projection 37, and thereby apply and then relieve the braking pressure on the driving shaft 3. In the drawings the shiftable gear 13 is shown as being idle, and the shiftable gear 12 is in the process of being shifted into engagement with the gear 9; that is, the actuator 14 is being moved in the direction of arrow $f$, Fig. 1, and is in such a position that the projection 37 is acting on the arm 36 which is preferably provided with an anti-friction roll 38. When the parts are in the position shown in Figs. 1 and 3 the braking pressure is applied to the brake disk 26, and since the arm 32 is of some considerable length, this momentary application of the braking pressure is sufficient to accomplish the desired end. As the actuator 14 completes its movement in the direction of the arrow $f$, so as to bring the gear 12 into mesh with the gear 9, the projection 37 will pass out from under the arm 36, thus relieving the braking pressure, so that as soon as the gears are completely shifted, and the clutch for the driving shaft 3 is engaged, the transmission gearing will be free to be started up. With the construction illustrated, it would be evident that whenever either actuator is shifted, the brake will be momentarily applied to the shaft 3. The length and time that said brake is applied to the shaft depends upon the speed with which the shifting of the actuators is accomplished. If either actuator is moved rapidly the brake is applied just sufficiently to reduce slightly the speed of rotation of the driving shaft, while if either actuator is moved slowly the brake may be applied sufficiently to bring the driving shaft nearly, if not quite, to rest. If the speed is to be shifted from high speed to the next lower speed, the actuator will be moved with a comparatively quick movement which will operate to apply the brake for a sufficient length of time to reduce the speed of the driving shaft slightly so that the gears 8 and 13 will be rotating at substantially the same speed (it being understood, of course, that the gear 8 will derive its rotation from the movement of the vehicle and the consequent rotation of the driven shaft), while if the change is to be from the high speed to the next to the lowest speed the actuator will be moved more slowly so as to reduce the rotation of the driving shaft to a point where the gears 12 and 9 will be rotating at substantially the same speed before said gears are brought into engagement. It will thus be seen that by properly manipulating the actuators the speed of the driving shaft can be controlled after the clutch is disconnected so that the gears which are to be brought into mesh will be rotating at substantially the same speed. There will therefore be no danger of stripping the gears during the shifting of the transmission gearing to effect the change of speed.

The brake disk 26 and its brake bands are located inside of the casing 200 for the transmission gearing, and are therefore working in oil. As a consequence, this brake will have very little wear, and there is no liability that it will become unduly heated. For this reason, and also because the brake is capable of developing considerable resistance, it is of advantage to be able to use it as a brake for the vehicle, and to permit this to be done, I have provided means whereby this brake may be applied by hand as well as by the operation of the actuators 14 and 15. The shaft 34 has loosely mounted thereon an arm 39, which is connected by a suitable link or connection 40 to the ordinary brake treadle, or to any other lever or treadle desired. This arm 39 is provided with a pin 41, which is adapted to engage another arm 42 rigid with the shaft 34, so that when the arm 39 is operated manually the pin 41 will be brought against the arm 42, thereby rocking the shaft 34, and applying the brake to the shaft 3. It will therefore be possible to use this brake on the shaft 3, instead of the regular brakes of the vehicle for retarding the speed thereof under many conditions. This is an advantage, because the ordinary brakes which are exposed to the dust and dirt, wear very rapidly, especially on a heavy truck designed for carrying heavy loads, where the brake is used with great frequency. The brake herein shown is not subject to much wear, because it is entirely protected, and because it is operating in oil.

I have herein shown a plate 44, interposed between the arm 32 and 35, this plate being for the purpose of preventing the rocking movement of the arm 35 from having any tendency to displace the arm 32 laterally.

The actuators 14, 15, are shown as each having connected thereto a link 45, which is connected to a slide 46, mounted in suitable guides underneath the grid 47. This grid has the usual H slot 48 through which the actuating lever 49 extends, said lever being the one by which the transmission gearing is actuated to effect change of speed. Each slide 46 has a pin 50 extending therefrom, which is adapted to be engaged by the lever 49, as usual in devices of this nature. In order to permit each actuator to move the necessary distance to effect the operation of the brake, I make the H slot 48 of the shape shown in Fig. 7, so as to allow sufficient extent of movement of the lever 49. Each projection 37 is so situated so that it will engage the arm 36 when the actuator is in the center of its stroke, and to permit of a proper operation of the actuating lever 49, I make the H slot 48 with the space between the tongues 51 considerably greater than the width of lever 49. In operating the device it is essential that in shipping either of the gears 12, 13 the lever 49 should be operated so as to carry said gear out of mesh with the gear in which it was formerly in mesh and past the center position, so as to cause the brake to be applied before said lever is disconnected from its slide. The elongated space between the tongues 51 permits the lever 49 to be moved through a sufficient space to cause the brake to be applied while passing from one end of the H slot to the other.

The shafts 3, 7, 11 and 4 are sustained in suitable roller bearings, and one feature of my invention relates to a construction of these roller bearings which permits a ready adjustment thereof as wear occurs. The roller bearings are of that type embodying a series of conical rolls 55 rotating between two rings or tracks 56 and 57. The ring or track 56 is in each instance in engagement with a shoulder or abutment such as 58 in Fig. 1. As wear occurs in this type of bearing, it is necessary to shift the rings 56 and 57 relative to each other longitudinally of the shaft, and I accomplish this herein by mounting the ring 57 in an annular carrier 59, which is screw threaded into the bearing, so that by turning the carrier 59 it will be moved longitudinally of the shaft, thereby to take up any wear in the bearings. In order to simplify and cheapen the construction, I make the bearing for each of the carriers in two sections, as shown at 60 and 61, these two halves of the bearings each having a semi-circular screw threaded seat to receive the screw threaded carrier 59. These two half bearings can be readily made, and may be secured in place in the casing 200 in any appropriate way, as by means of the bolts 62. I have herein shown each bolt 62 as provided with a collar 63, which is received in two half recesses, formed in the meeting sides of the members 60 and 61 respectively, each bolt having applied thereto clamping nuts 64, by which the two members 61, 62, are clamped together, and by which they are also secured to the casing 200. The collars 63 serve to help position the two members 60 and 61, and keep them in alinement with each other.

I have also provided a simple locking device for locking the carriers 59 from rotation after they have been once adjusted. This locking device is shown at 65, and it comprises a locking finger 66, and it is adapted to be secured to the bearing member 60. The finger 66 is adapted to enter in one of a number of grooves 67, formed in the carrier 59, so that when the carrier has been properly adjusted the locking finger may be entered into the proper groove 67, and may then be clamped to the bearing member 60. By making each carrier 59 with a plurality of notches 67, a very fine adjustment of the bearing can be secured. I propose to use a bearing of this nature where a bearing is required for any of the shafts in my improved transmission gearing.

what I claim as new and desire to secure by Letters Patent is:—

1. The combination with a driving shaft and a driven shaft, of transmission gearing connecting said shafts and comprising a shiftable gear adapted by its change in position to effect a change of speed in the driven shaft, an actuator for said shiftable gear, a brake for the driving shaft and means controlled by said actuator to apply the brake.

2. The combination with a driving and a driven shaft of transmission gearing connecting said shafts and comprising a shiftable gear, an actuator for said gear, a brake for the driving shaft and means operated by said actuator to apply the brake at a predetermined point in the movement of the actuator.

3. The combination with a driving and a driven shaft, of transmission gearing connecting said shafts, and comprising a shiftable gear, an actuator for said gear, a brake for the driving shaft, and means operated by said actuator to apply the brake at a predetermined point in the movement of the actuator, and then to release the brake before the completion of the movement of the actuator.

4. The combination with change gearing adapted to produce various speeds, of an actuator for effecting the change of speed, a brake to retard the rotation of the change gearing during the change of speed and means to apply the brake by the movement of the actuator.

5. The combination with a driving shaft, of a transmission gearing connected thereto, and provided with two shiftable gears, an actuator for each gear, a brake for the driving shaft and means to operate the brake by the movement of either actuator.

6. In a driving mechanism, the combination with a driving shaft and a driven shaft, of a transmission gearing connecting said shafts, a casing inclosing said transmission gearing, and a brake for the driving shaft inclosed within said casing.

7. In a driving mechanism, the combination with a driving shaft and a driven shaft, of a transmission gearing connecting said shafts, a casing inclosing said transmission gearing, a brake for the driving shaft inclosed within the casing, an actuator for shifting the transmission gearing to effect a change of speed, and means to apply the brake by the movement of the actuator.

8. In a driving mechanism, the combination with a driving and a driven shaft, of transmission gearing connecting said shafts and comprising two gears, a shiftable gear movable from a position in mesh with one gear to a position in mesh with the other gear, an actuator for said shiftable gear, a brake for the driving shaft, means operated by said actuator after it has advanced sufficiently to disconnect the shiftable gear from one of said first-named gears to apply the brake and then to release the brake before the completion of the movement of said actuator.

In testimony whereof, I have signed my name to this specification, in the presence of two subscribing witnesses.

JOHN ECKHARD.

Witnesses:
Louis C. Smith,
Frederick S. Greenleaf.